United States Patent [19]

Moller

[11] 4,165,522

[45] Aug. 21, 1979

[54] VIDEO RECORDER AND PLAYBACK UNIT INCLUDING REMOTELY OPERABLE TIMED FAST FORWARD ADVANCE

[76] Inventor: Godfrey T. Moller, Guaranty Bank Plz., Corpus Christi, Tex. 78475

[21] Appl. No.: 904,230

[22] Filed: May 9, 1978

[51] Int. Cl.² ................ G11B 15/46; G11B 15/18
[52] U.S. Cl. ........................... 360/73; 360/33
[58] Field of Search ............... 358/194; 360/33, 71, 360/72, 73

[56] References Cited

U.S. PATENT DOCUMENTS

| | | | |
|---|---|---|---|
| 3,854,123 | 12/1974 | Banach | 358/194 |
| 3,903,369 | 9/1975 | Darwood | 360/72 |
| 3,987,484 | 10/1976 | Bosche et al. | 360/33 |
| 4,014,039 | 3/1977 | Kaisha | 360/72 |
| 4,048,659 | 9/1977 | Fink et al. | 360/73 |

Primary Examiner—Stuart N. Hecker

Attorney, Agent, or Firm—G. Turner Moller

[57] ABSTRACT

There is disclosed a video recorder and playback unit in which video and audio signals broadcast from a conventional television station are encoded on a recording medium. During playback of the medium, the medium is advanced relative to a pickup unit in a playback direction at a predetermined rate for playing back the encoded signals. During playback, a picture tube and a speaker respectively displays an image representative of the video signal and creates sound energy representative of the audio signal. A selective fast forward advance mechanism is operable from a position remote from the picture tube for selectively advancing the medium relative to the pickup in the playback direction a predetermined distance at a rate in excess of the playback rate. This allows the viewer to skip segments of predetermined time duration that the viewer does not desire to see.

12 Claims, 3 Drawing Figures

VIDEO RECORDER AND PLAYBACK UNIT INCLUDING REMOTELY OPERABLE TIMED FAST FORWARD ADVANCE

This invention relates to an improvement in video recorder and playback units.

Video recorder and playback units were introduced to the consumer market to allow the viewer to record the audio and video signals broadcast by conventional television stations. The consumer is then able to view the television broadcast at his convenience.

There are, of course, a number of different techniques used to record and playback broadcast audio and video signals. Although this invention is applicable to any type of recording medium and any type recording and playback arrangement as will be more fully apparent hereinafter, it will be described in conjunction with a cartridge enclosed length of magnetic video tape.

In the present commercially available video recorder and playback units, there is a provision for skipping, during recording, of any segment of the broadcast signal that the consumer does not wish to record and ultimately view. Such provisions are known as pause features and typically comprise a mechanism for stopping the advance of the video tape during recording. This allows the viewer the option of not recording segments of the broadcast which the consumer does not want to view later. Although the undesired segments may vary widely in content, such typical segments include commercials or advertisements and inactive portions of sporting events such as the huddles in football games or the replacement of pitchers in baseball games. It will be evident, however, that this pause feature is operable only during recording and does not allow a viewer to skip over undesired viewing segments from a recorded broadcast as may occur when a broadcast is encoded in its entirety.

It is known in the prior art, as shown in U.S. Pat. No. 3,661,395, to provide a timed fast forward advance for an endless tape cartridge. In this device, the fast forward speed is approximately eight times the normal playing speed. A control knob is rotated from a position where a pointer aligns with a zero marking on an associated scale to a location where the pointer aligns with a scale marking which corresponds to the time interval through which fast forward feeding of the magnetic tape is accomplished. Upon rotation of the control knob away from the zero position, an actuating arm moves off of an actuating switch thereby initiating fast forward movement of the magnetic tape. The defect in this device may be explained by the following example. Assuming that the individual desires to fast forward the tape for a time duration of one minute, the fast forward speed is eight times the normal playing speed and it takes the user ten seconds to move the control knob from the zero position to the one minute position, the magnetic tape is driven in the forward direction at the accelerated rate as soon as the control knob begins movement away from the zero position. If it takes the user ten seconds to manipulate the knob to the one minute position, the tape will be advanced through a playing interval of 80 seconds by the time the control knob is placed at the one minute position. Because the unit will continue at a fast forward advance for an additional one minute, it will be apparent that the tape will be advanced for a total of 140 seconds of playing duration. It will according be apparent that regardless of how fast the control knob is moved, the tape is not advanced at a fast forward rate for a predetermined distance. In fact, the tape is moved, at a fast forward rate, for a selected predetermined distance plus an indeterminate distance which varies as a function of the speed in which the control knob is turned.

Another disclosure of interest is found in U.S. Pat. No. 3,984,869. In this device, the recorded magnetic tape remains in contact with a playback head. A fast forward switch is energized to drive the tape at an accelerated rate in the forward direction. The fast forward advance of this tape is terminated in response to the absence of signals on the tape as will occur between spaced selections recorded thereon.

In summary, this invention comprises a video recorder and playback unit of any suitable type including a recordable medium and means for encoding an audio and a video signal on the medium and means for playing back the recorded signals. In the case of a cartridge videotape, a mechanism is provided for advancing the medium in a forward or record direction relative to a signal transducer at a predetermined rate for recording the video and audio signals on the tape. During the playback mode of operation, the tape is advanced in the forward or playback direction relative to a signal pickup device for playing back the encoded video and audio signals. Although the video recorder and playback unit may comprise its own picture tube and one or more speakers, it is typically operatively connected to a separate television set providing these components. During the playback mode of operation of the unit, an image is displayed on the picture tube representative of the video signal and sound energy is created by the speaker representative of the audio signal.

In order to skip over undesired viewing segments of the television broadcast, there is provided a mechanism remotely operable from the picture tube for selectively advancing the video tape a predetermined distance at a rate in excess of the normal playback rate. The distance through which the videotape is advanced at a rapid rate is correlated with a predetermined recorded time interval. For example, it is apparent that the duration of inactivity between football plays is somewhat in excess of 30 seconds. Similarly, the duration of most commercials is in multiples of 30 seconds. Accordingly, the amount of fast forward advance is desirably a multiple of a relative short time interval, for example about 15 or about 30 seconds.

Another feature of the invention resides in the capability of adjusting the amount of the predetermined fast forward advance. This may be accomplished by a potentiometer in circuit with the tape advance mechanism which is controlled by a thumbwheel or knob accessible from the exterior of the unit.

It is accordingly an object of this invention to provide a video recorder and playback unit incorporating a remotely operable fast forward advance mechanism for skipping over a predetermined length of medium or skipping over a predetermined time interval represented on the medium.

Other objects and a fuller understanding of the invention may be had by referring to the following description taken in conjunction with the accompanying drawings and claims.

IN THE DRAWINGS

Figure 1:
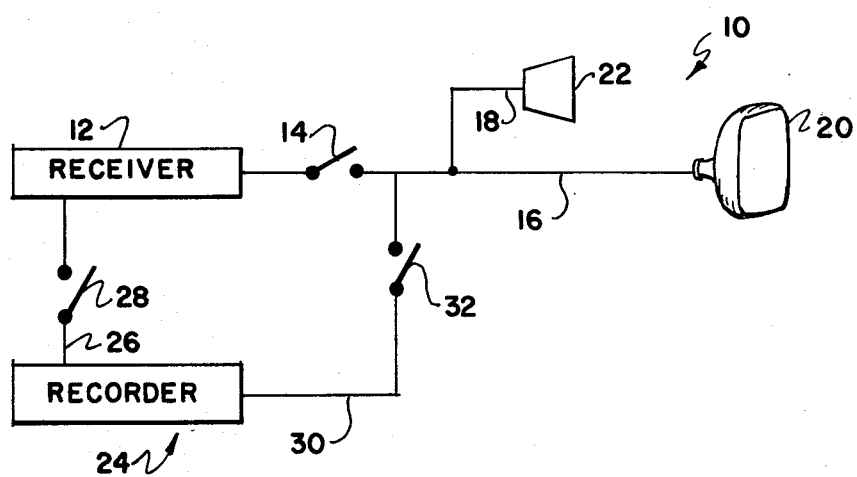
FIG. 1 is a schematic view of a conventional recorder and playback unit.
Figure 2:
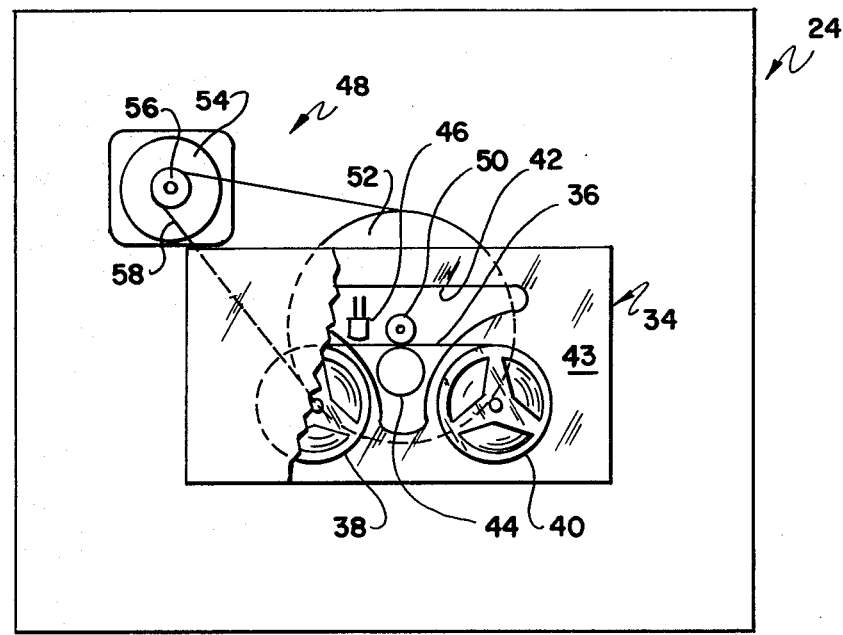
FIG. 2 is a schematic showing of an endless magnetic tape cartridge player with which this invention may be used.

Referring to the drawings, there is illustrated a video recorder and playback unit 10 which may be of any suitable type comprising a suitable television receiver 12 operatively connected by a switch mechanism 14 and one or more electrical connections 16, 18 to a picture tube 20 and a speaker 22 respectively. The receiver 12, tube 20 and speaker 22 may typically comprise part of a conventional television set or may be incorporated in a single unit with a video recorder and playback mechanism 24. The mechanism 24 communicates by an electrical connection 26 and switch 28 to the receiver 12 for selectively recording signals received from the receiver 12 and communicates through an electrical connection 30 and switch 32 for selectively playing back previously recorded signals through the tube 20 and speaker 22. The switches 14, 28, 32 may be ganged together as desired.

The mechanism 24 may be of any suitable type and is illustrated as being of the type incorporating a cartridge 34 having therein a length of magnetic tape 36 of substantially uniform recording characteristics wound on a pair of reels 38, 40. The cartridge 34 is of any suitable design having an opening 42 in the cartridge bottom wall 43. The magnetic tape 36 is mounted for movement across the opening 42 adjacent a pinch roller 44 comprising part of the mechanism 24. The tape 36 is also in contact with transducer 46 which comprises a record section and a playback or pickup section. It will be apparent that the record and pickup sections may be located on separate supports. It will be evident that the transducer 46 acts to encode signals on the magnetic tape 36 representative of the audio and video signals received by the television receiver 12 in a conventional manner. Similarly, the transducer 46 acts to receive signals representative of the recorded audio and video signals and to deliver signals to the picture tube 20 and speaker 22 during the playback mode of operation.

The mechanism 24 also comprises a device 48 for driving the magnetic tape 36 in a forward direction at a predetermined rate during the record and playback modes of operation, for driving the magnetic tape 36 in a reverse or rewind direction at an increased rate and for driving the magnetic tape in a forward direction at an accelerated rate. Although the device 48 may be of any suitable type, it is illustrated as comprising a capstan 50 positioned to captivate the magnetic tape 36 against the pinch roller 44 and connected for rotation with a pulley 52, a reversible multi-speed motor 54 having an output 56, and a drive connection 58 operatively connecting the motor output 56 and the pulley 52. The drive connection 58 is illustrated as an endless belt although it may be of any suitable type as desired. As mentioned previously, it is desired to provide the mechanism 24 with the capability of advancing the magnetic tape 36 in the forward or playback direction for a predetermined distance at a rate in excess of the normal predetermined playback rate. Fast forward advance of the mechanism 24 is initiated from a position remote from the picture tube 20. As used herein, the word remote is defined to mean in excess of arms length. The distance that the tape 36 is advanced at an accelerated rate is correlated with the time interval corresponding to the recorded segment which is desired to be bypassed, i.e. not viewed on the tube 20 or heard on the speaker 22. The interval that is bypassed is a fixed predetermined interval in the sense that activation of the remote controller causes the tape 36 to fast forward advance a predetermined distance which is not dependent on operator control at the instant of activation. It is desired, however, that the interval of tape bypassed be subject to change, either by selecting one of a plurality of fast forward commands immediately prior to the instant of activation and/or by adjusting the mechanism prior to activation.

Figure 3:
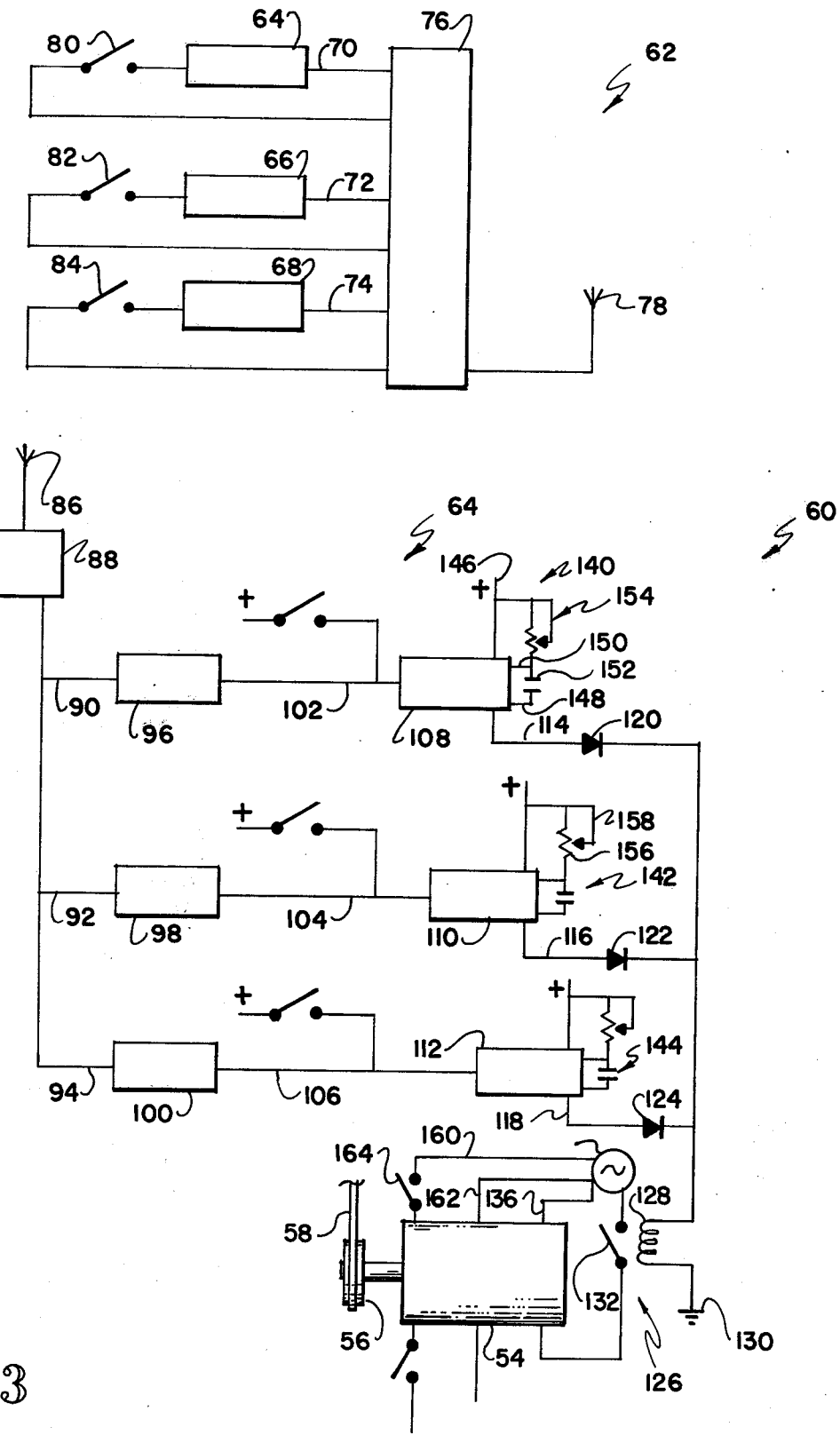
FIG. 3 is a schematic view of a remote transmitter used to initiate fast forward movement of the magnetic tape illustrated in FIG. 2 and a receiver incorporated in the video recorder and playback unit.

To these ends, there is illustrated in FIG. 3 a control circuit 60 for the motor 54 comprising a controller 62 for remotely initiating activation of a circuit 64 to energize the motor 54 to drive the capstan 50 in the forward direction at an accelerated rate.

Although the controller 62 may be of any suitable type, it is illustrated as comprising a plurality of tone oscillators 64, 66, 68 respectively connected by wire pairs 70, 72, 74 to a transmitter 76. Although the tone oscillators 64, 66, 68 may be of any suitable type, one acceptable version is identifiable by parts number NE 567. Similarly, the transmitter 76 may be of any suitable type such as an electrical conduit or a radiofrequency transmitter of the same type presently used in the remote selection of television channels. The transmitter 76 provides an antenna 78. Each of the wire pairs 70, 72, 74 incorporates a switch 80, 82, 84 for closing a circuit from the tone oscillators 64, 66, 68 to the transmitter 76. The tone oscillators 64, 66, 68 are selected to provide different tone frequencies f1, f2, f3 respectively which are selectively broadcast by the transmitter 76 or which activate the transmitter 76 to broadcast at different tone frequencies for purposes more fully apparent hereinafter.

The circuit 64 includes an antenna 86 and a receiver 88 for receiving the signals of different frequency broadcast by the transmitter 76. The receiver 88 is connected by wires 90, 92, 94 to a plurality of integrated circuits 96, 98, 100 known as phase lock loops identifiable by part number NE 566. The phase lock loops 96, 98, 100 operate in response to receiving a signal of the respective frequencies f1, f2, f3 to generate a signal on an output 102, 104, 106 to a plurality of monostable multivibrators 108, 110, 112 which are identifiable by parts number NE 555. The multivibrators 108, 110, 112 operate in response to receiving a signal to generate an output signal of predetermined duration on an electrical lead 114, 116, 118. The leads 114, 116, 118 each incorporate a diode 120, 122, 124 to isolate the multivibrators 108, 110, 112 from electrical currents produced by the motor 54 or other extraneous sources. The wires 114, 116, 118 are in parallel and are each connected in series with a relay 126 comprising a winding 128 connected to a ground 130 and a switch element 132 disposed in one of a pair of wires 134, 136 leading between the motor 54 and a source of power 138. It will be apparent that the time interval in which the winding 128 is energized and the switch element 132 closed is a function of the duration of the signal emitted by the multivibrators 108, 110, 112.

The duration of the signal delivered by the multivibrators 108, 110, 112 is a function of R-C networks 140, 142, 144 which are identical and are of conventional configuration for this purpose. The networks each include an electrical lead 146 connected between a source of positive D.C. potential and one of the pins of the multivibrators 108, 110, 112. A pair of leads 148, 150 connect to other pins of the multivibrator 108, 110, 112 and connect to a capacitor 152. A potentiometer 154 is connected with the capacitor 152 and comprises a resistor 156 and an adjustable contact mechanism 158 for varying the effective resistance of the resistor 156 to vary the duration of the signal emitting from the multivibrators 108, 110, 112.

The R-C networks 140, 142, 144 are preferably designed or adjusted such that the duration of the signals generated by the multivibrators 108, 110, 112 are different and are substantially multiples of a predetermined time interval. As mentioned previously, the amount of fast forward advance effected by the control circuit 60 is desirably a multiple of a relatively short time interval, for example about 15 or about 30 seconds. It will be appreciated that the duration of the signal emitted from the multivibrators 108, 110, 112, must be correlated with the fast forward speed of the motor 54 to attain the desired predetermined distance bypassed during the selective fast forward advance of the magnetic tape 36. Assuming for purposes of illustration that the fast forward speed of the motor 54 is four times the normal predetermined speed during recording and playback, the duration of the signals emitted by the multivibrators 108, 110, 112 should be one fourth the time intervals desired to be bypassed. It is contemplated that one approach is to design the multivibrator 108 to fast forward advance the tape for a playing duration of 30 seconds, to design the multivibrator 110 to fast forward advance the tape for a playing duration of one minute and to design the multivibrator 112 to fast forward advance the tape for a playing duration of two minutes. Such a selection will allow the user to skip over such predictable undesirable viewing segments as football huddles and commercials.

It is appreciated that the television networks may take objection to the user skipping over the commercials and take steps to counteract or frustrate the use of this invention. One technique that could be employed is to change the duration of aired commercials which are presently in multiples of about 15 seconds. By changing this multiple to 13 seconds, for example, the networks would cause the user to skip over several seconds of a desired viewing segment immediately following a commercial. By positioning the adjustment for the adjustable contact 158 to be accessible from the exterior of the cabinet, the user can adjust the duration of the signals emitted by the multivibrators 108, 110, 112 and thus adjust for a network tactic of this type. If the three different networks were to change the multiples of their commercials differently, e.g. to 11, 13, and 17 seconds respectively, a similar but more complicated problem is faced by the user. To facilitate overcoming this tactic, the potentiometers 154 are preferably designed to provide a wide range of adjustment so that the multivibrator 108 could, for example, be used to skip over about four multiples of one network's basic time interval, the multivibrator 110 could be used to skip over about four multiples of the second network's basic time interval and the multivibrator 112 could be used to skip over about four multiples of the third networks basic time interval. It will be apparent to those skilled in the art that more complicated means are available to provide the capability of skipping over one, two and four multiples of three different basic time intervals.

As shown in FIG. 3, the motor 54 also includes a pair of leads 160, 162 extending from a low speed winding in the motor 54 to the source of power 138. The lead 160 incorporates a switch element 164 which is closed when the mechanism 24 is place in either the record or playback mode of operation and which is opened in response to energization of the relay winding 128. In this fashion, the motor 54 normally drives the magnetic tape 36 in the forward direction at a predetermined rate of movement. Activation of the control circuit 60 to drive the motor 54 at an accelerated rate in the forward direction causes the leads 160, 162 to be deenergized. As soon as the winding 128 is deenergized following the termination of the signal emitting from one of the multivibrators 108, 110, 112, the switch element 132 opens and the switch element 164 recloses to again drive the motor 54 in the forward direction at the normal rate of movement.

In use, the unit 10 is manipulated in a conventional manner to continuously record a broadcast between first and second locations on the magnetic tape 36 corresponding to the normal beginning and end of a program. When it is desired to view the recorded broadcast, the user merely operates the unit in its conventional fashion to playback the recorded program, watches the desired segments on the tube 20, and holds the controller 62. When the program approaches an undesired viewing segment of predictable duration, such as a huddle during a football game, the user merely depresses the switch 80 of the controller 62. This actuates the tone oscillator 64 and a signal of predetermined frequency f1 is broadcast by the transmitter 76. The broadcast signal is detected by the receiver 88 and delivered over the wires 90, 92, 94 to the phase lock loops 96, 98, 100. The particular phase lock loop 96, 98, 100 which is tuned to be activated by the frequency f1 is energized to deliver a signal. In this example, the phase lock loop 96 is energized and a signal is delivered along the output 102 to the multivibrator 108. The R-C network 154 associated with the multivibrator 108 controls the output signal generated thereby to energize the relay 126 for a time interval sufficient to drive the motor 54 to advance the magnetic tape 36 for a time interval of 30 seconds. During fast forward advance of the magnetic tape 36, the transducer 66 may be moved out of contact with the tape 36 as suggested in U.S. Pat. No. 3,661,395 or the transducer 66 may be left in contact with the tape 36 and the output signal from the transducer squelched as suggested in U.S. Pat. No. 3,984,869. When the multivibrator 108 ceases to emit a signal on the output 114, the relay winding 126 deenergizes and the switch element 132 opens to deenergize the high speed winding to which the leads 134, 136 are connected. The motor 54 then resumes operation in the forward direction at the normal rate as controlled by the leads 160, 162, the switch element 164 and the source of power 138.

In the event that an undesired viewing segment appears on the picture tube 20 immediately following the fast forward advance, the user may again depress the switch 80 to bypass an additional 30 second interval on the magnetic tape 36.

When the program approaches an undesired viewing segment of predictable duration which is known by the user to be in excess of 30 seconds, the user may depress the switch 82 to fast forward advance for one minute or depress the switch 84 to fast forward advance for two minutes.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed.

I claim:

1. A video recorder and playback unit, comprising;
   a medium of substantially uniform recording characteristics between first and second locations, means for receiving transmitted audio and visual signals, and means for continuously encoding a signal representative of the transmitted audio signal and a signal representative of the transmitted video signal on the medium between the first and second locations;
   means for advancing the medium in a playback direction at a predetermined rate for playing back the encoded signals;
   means including a picture tube and a speaker operatively associated with the medium during advancement in the playback direction for displaying an image on the picture tube representative of the video signal and for creating sound energy representative of the audio signal; and
   means operable from a position remote from the picture tube during playback between the first and second locations for selectively advancing the medium in the playback direction a predetermined distance, independent of encoded signals, at a rate in excess of the predetermined rate.

2. The video recorder and playback unit of claim 1 wherein the selectively energized means comprises means for selectively advancing the medium at a rate in excess of the predetermined rate in the playback direction a plurality of different predetermined distances.

3. The video recorder and playback unit of claim 1 further comprising means for adjusting the first mentioned predetermined distance to a second different predetermined distance.

4. The video recorder and playback unit of claim 1 wherein the selectively energizable means comprises means for advancing the medium in the playback direction a predetermined distance comprising a multiple of the product of the predetermined rate of advance and about fifteen seconds.

5. The video recorder and playback unit of claim 1 wherein the selective energizing means includes a frequency transmitter remote from the picture tube and means responsive to the transmitted frequency for advancing the medium in the playback direction a predetermined distance at a rate in excess of the predetermined rate.

6. The video recorder and playback unit of claim 5 wherein the selective energizing means includes means for broadcasting a plurality of different frequencies from the transmitter and the means responsive to the transmitted frequency includes means for advancing the medium in the playback direction for one of a plurality of predetermined distances in response to different ones of the transmitted frequencies.

7. The video recorder and playback unit of claim 1 wherein the advancing means includes a multi-speed electric motor and the motor comprises part of the selective energizing means.

8. The video recorder and playback unit of claim 1 wherein the selective energizable means comprises switch means remote from the picture tube and means responsive to actuation of the switch means for energizing the advancing means.

9. The video recorder and playback unit of claim 1 wherein the medium comprises an elongate strip of magnetizable tape.

10. The video recorder and playback unit of claim 1 wherein the selective energizing means includes means for advancing the medium in the playback direction for only a selected one of a plurality of different fixed distances at a rate in excess of the predetermined rate.

11. The video recorder and playback unit of claim 1 wherein the advancing means comprises means for advancing the medium in the playback direction at the rate in excess of the predetermined rate and the remotely operable means comprises means for selectively energizing the means advancing the medium at the rate in excess of the predetermined rate and further comprising means independent of said medium for selectively deenergizing the means advancing the medium at the rate in excess of the predetermined rate.

12. A video recorder and playback unit, comprising;
    means for receiving a medium of substantially uniform recording characteristics between first and second location;
    means for encoding a transmitted audio and video signal on the medium between the first and second locations;
    transducer means for playing back the encoding signals during relative movement between the transducer means and the medium;
    means for advancing the medium relative to the transducer means in a playback direction at a predetermined rate for playing back the encoded signals; and
    means operable from a position remote from the picture tube during playback between the first and second locations for selectively advancing the medium in the playback direction a predetermined distance independently of encoded signals, at a rate in excess of the playback rate.

* * * * *